(12) United States Patent
Bates et al.

(10) Patent No.: US 6,769,015 B1
(45) Date of Patent: Jul. 27, 2004

(54) ADOPTING BROWSER ENVIRONMENTAL ATTRIBUTES OF E-MAIL SENDER

(75) Inventors: Cary Lee Bates, Rochester, MN (US); Paul Reuben Day, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 698 days.

(21) Appl. No.: 09/633,433

(22) Filed: Aug. 7, 2000

(51) Int. Cl.[7] .............................................. G06F 15/16
(52) U.S. Cl. ..................... 709/206; 709/219; 715/501.5; 715/513
(58) Field of Search ................................. 709/245, 219, 709/225, 232, 224, 206, 223, 218; 705/1, 27; 715/501.1, 513

(56) References Cited

U.S. PATENT DOCUMENTS

| | | | | | |
|---|---|---|---|---|---|
| 6,031,989 A | * | 2/2000 | Cordell | ........................ | 717/109 |
| 6,118,449 A | * | 9/2000 | Rosen et al. | ................. | 715/513 |
| 6,295,058 B1 | * | 9/2001 | Hsu et al. | .................... | 345/769 |
| 6,360,254 B1 | * | 3/2002 | Linden et al. | ............... | 709/219 |
| 6,546,397 B1 | * | 4/2003 | Rempell | ................... | 715/501.1 |
| 6,574,604 B1 | * | 6/2003 | van Rijn | ......................... | 705/1 |
| 6,684,369 B1 | * | 1/2004 | Bernardo et al. | ............ | 715/513 |

* cited by examiner

Primary Examiner—David Wiley
Assistant Examiner—Phuoc Nguyen
(74) Attorney, Agent, or Firm—Dillon & Yudell, LLP; Roy W. Truelson

(57) ABSTRACT

A method of electronically conveying information using a first electronic document having a selectable link embedded therein (e.g., a hypertext link), wherein at least one presentation attribute is associated with the link, by presenting a second (linked) electronic document using the presentation attribute, in response to selection of the link. In the illustrative embodiment, a sender of an e-mail message embeds the link in the message and associates the particular presentation attributes. The presentation attributes are encoded into the message, and are thus sent with the message across a network such as the Internet. The presentation attributes may be associated with the link by capturing current settings, or by specifying custom settings. In this manner, when the recipient of the message selects the link, a web browser is launched, and uses the appropriate environmental attributes to present the linked web page. The recipient has the ability to selectively override sender-defined attributes.

28 Claims, 5 Drawing Sheets

ADOPTING BROWSER ENVIRONMENTAL ATTRIBUTES OF E-MAIL SENDER

BACKGROUND OF THE INVENTION

1. Technical Field

The present invention generally relates to computer systems, specifically to a method of presenting information that is retrieved across a network, such as the Internet, and more particularly to a method of setting environmental attributes of a graphical user interface provided by a browser program.

2. Description of Related Art

A generalized client-server computing network 2 is shown in FIG. 1. Network 2 has several nodes or servers 4, 6, 8 and 10 which are interconnected, either directly to each other or indirectly through one of the other servers. Each server is essentially a stand-alone computer system (having one or more processors, memory devices, and communications devices), but has been adapted (programmed) for one primary purpose, that of providing information to individual users at another set of nodes, or workstation clients 12. A client is a member of a class or group of computers or computer systems that uses the services of another class or group to which it is not related. Clients 12 can also be stand-alone computer systems (like personal computers, or PCs), or "dumber" systems adapted for limited use with network 2 (like network computers, or NCs). A single, physical computer can act as both a server and a client, although this implementation occurs infrequently.

The information provided by a server can be in the form of programs which run locally on a given client 12, or in the form of data such as files that are used by other programs. Users can also communicate with each other in real-time as well as by delayed file delivery, i.e., users connected to the same server can all communicate with each other without the need for the network 2, and users at different servers, such as servers 4 and 6, can communicate with each other via network 2. The network can be local in nature, or can be further connected to other systems (not shown) as indicated with servers 8 and 10.

The construction of network 2 is also generally applicable to the Internet. In the context of a computer network such as the Internet, a client is a process (i.e., a program or task) that requests a service which is provided by another program. The client process uses the requested service without having to "know" any working details about the other program or the service itself. Based upon requests by the user, a server presents filtered electronic information to the user as server responses to the client process.

Conventional protocols and services have been established for the Internet which allow the transfer of various types of information, including electronic mail via simple mail transfer protocol (SMTP), basic file transfers via FTP (file transfer protocol), remote computing via Telnet, "gopher" searching, Usenet newsgroups, and hypertext file delivery and multimedia streaming via the World Wide Web (WWW). A given server can be dedicated to performing one of these operations, or running multiple services. Internet services are typically accessed by specifying a unique address, or universal resource locator (URL). The URL has two basic components, the protocol to be used, and the object pathname. For example, the URL "http:// www.uspto.gov" (home page for the United States Patent & Trademark Office) specifies a hypertext transfer protocol ("http") and a pathname of the server ("www.uspto.gov"). The server name is associated with a unique numeric value (a TCP/IP address, or "domain").

The present invention relates to the presentation of computer files that are distributed on a network like the Internet, but is particularly applicable to the WWW, which provides files that are conveniently linked for user access. For example, as illustrated in FIG. 2, a group 14 of files or pages 16a–16h are interrelated by providing hypertext links in each of the files (group 14 may thus be considered a typical "web site"). A hypertext link is an image that is viewable on the workstation's display 18, which can be selected by the user (e.g., using a pointing device or "mouse") and which then automatically instructs client workstation 12 to request another page associated with that particular hypertext link (i.e., issue another URL). A hypertext link may appear as a picture, or as a word or sentence, possibly underlined or otherwise accentuated to indicate that it is a link and not just normal, informative text.

A WWW page may have text, graphic (still) images, and even multimedia objects such as sound recordings or moving video clips. A hypertext page, if more than just text, is usually constructed by loading several separate files, e.g., the hypertext file "main.html" might include a reference to a graphic image file "picture.gif" or to a sound file "beep-.wav". When a client workstation 12 sends a request to a server for a page, such as page 16a, the server first transmits (at least partially) the main hypertext file associated with the page, and then loads, either sequentially or simultaneously, the other files associated with the page. A given file may be transmitted as several separate pieces via TCP/IP protocol. The constructed page is then displayed on the workstation monitor 18 as shown in FIG. 2. A page may be "larger" than the physical size of the monitor screen (i.e., larger than the software-programmed "window" provided for viewing the page), and techniques such as scroll bars are used by the viewing software (the web browser) to view different portions of the page.

Web pages use field-based languages such as the hypertext markup language (HTML). This language provides a protocol for transmitting formatted information and control codes used to construct the "complete" page that is ultimately displayed by the browser. Different fields within the main HTML file are defined to store the formatted information and control code-parameters, using tags. Tags not only mark elements, such as text and graphics, but can also be used to construct graphical user interfaces within the web page (such as buttons that are "depressed" by selecting them using the graphical pointer). In HTML, a tag is a pair of angle brackets (<>) that contain one or more letters and numbers between the angle brackets. One pair of angle brackets is often placed before an element, and another pair placed after, to indicate where the element begins and ends. For the language "<B>TODAY ONLY<B>" uses the "B" tag to provide a boldface formatting code for the words "TODAY ONLY."

Web browsers can be adjusted in various ways to provide different presentation effects for web pages. For example, different default fonts may be selected for displaying alphanumeric characters, and different color schemes may be selected for displaying different page elements, such as plain text versus hypertext links. Audio features may be adjusted as well.

There are many other browser parameters which affect the presentation in less direct ways. One example involves the use of "cookies." A cookie is an identifier (e.g., a number) that is stored locally on the user's workstation, and is used to identify the workstation to a web site. In this manner, the web site can customize the content or arrangement of a web page based on the particular user. In other words, different workstations having different cookies can present the "same" web page in different forms.

A similar feature which may be adjusted is the use of java, or javascript. Java is an object-oriented programming language, and is used to program small applications (applets) for web pages, greatly enhancing presentation. Javascript is a scripting language used to design a set of instructions (commands), which may be used by a web browser. Javascript, while somewhat related to java, is not an object-oriented language. Javascript complements java by exposing useful properties of java applets to script authors. Many web browsers allow the user to selectively enable java or javascript As mentioned above, some HTML pages include references to other HTML pages by using a special HTML tag referred to as a link. Hypertext links provide a convenient method for reaching additional informational material, and they may be used in documents other than web pages. In particular, electronic mail (e-mail) messages may be created, using an HTML editor, which also have embedded hypertext links. The e-mail viewer is programmed to automatically open the web browser and pass on the web address when the user selects the link within the e-mail message (typically by clicking on the link using the mouse). In this manner, the sender of the e-mail message can immediately direct the message recipient to a desired web page.

When a user sends an e-mail message with an embedded link, however, there is no guarantee that the particular web site will be presented to the message recipient in the same fashion as it is perceived by the sender. Differences may easily arise due to the recipient having environmental browser settings which are different from those used by the sender to view the same page. These differences may be only slight, or very significant. For example, the recipient's browser may provide a default color scheme which would present plain text in the same color as the background color for the web page, making the text completely indiscernible. Critical document elements might be totally omitted if cookie or java options are not properly set. It would, therefore, be desirable to provide a method of allowing a sender of an e-mail message to specify which, if any, presentation attributes are to be associated with an embedded link. It would be further advantageous if the method could provide the message recipient with the ability to further adjust or override these settings.

SUMMARY OF THE INVENTION

It is therefore one object of the present invention to provide an improved method of presenting information on a computer system.

It is another object of the present invention to provide such a method which customizes environmental attributes of a graphical user interface provided by a browser program.

It is yet another object of the present invention to provide such a method which allows custom environmental attributes of a browser to be specified for any particular document link that is referenced in another document.

The foregoing objects are achieved in a method of electronically conveying information, generally comprising the steps of composing a first electronic document having at least one selectable link embedded therein (wherein the link provides an address of a second electronic document), selecting the link using a graphical user interface of a computer system, and presenting the second electronic document at the computer system using at least one presentation attribute associated with the link. In the illustrative embodiment, the composing is performed by the sender of an electronic mail (e-mail) message at a remote node of a network, and the first electronic document is transmitted across the network from the node to the computer system. The graphical user interface includes a graphical pointer controlled by a graphical pointing device of the computer system, and the selecting step is performed by displaying the link on a monitor of the computer system using viewing software, and actuating the graphical pointing device while the graphical pointer is held over the link on the monitor. The link may be for a hypertext page on the World Wide Web, so presentation of the second electronic document can be accomplished using a web browser. The presentation attribute may be associated with the link by capturing a current setting of the presentation attribute, or by specifying a custom setting for the presentation attribute. The recipient of the message has the ability to selectively override sender-defined attributes.

The above as well as additional objectives, features, and advantages of the present invention will become apparent in the following detailed written description.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF PREFERRED EMBODIMENT

Figure 1:
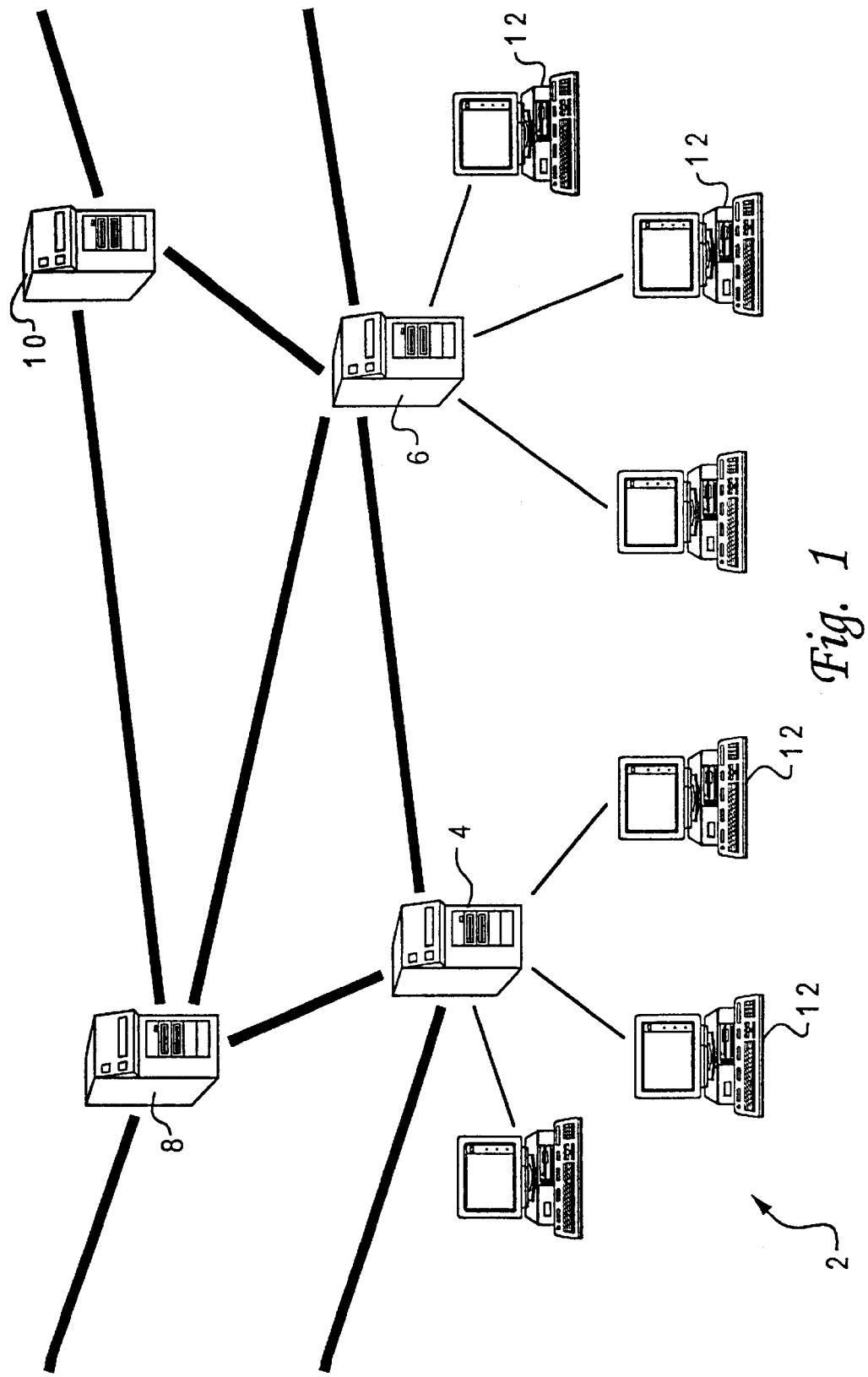
FIG. 1 is a diagram of a conventional computer network, including interconnected servers and client workstations.
Figure 2:
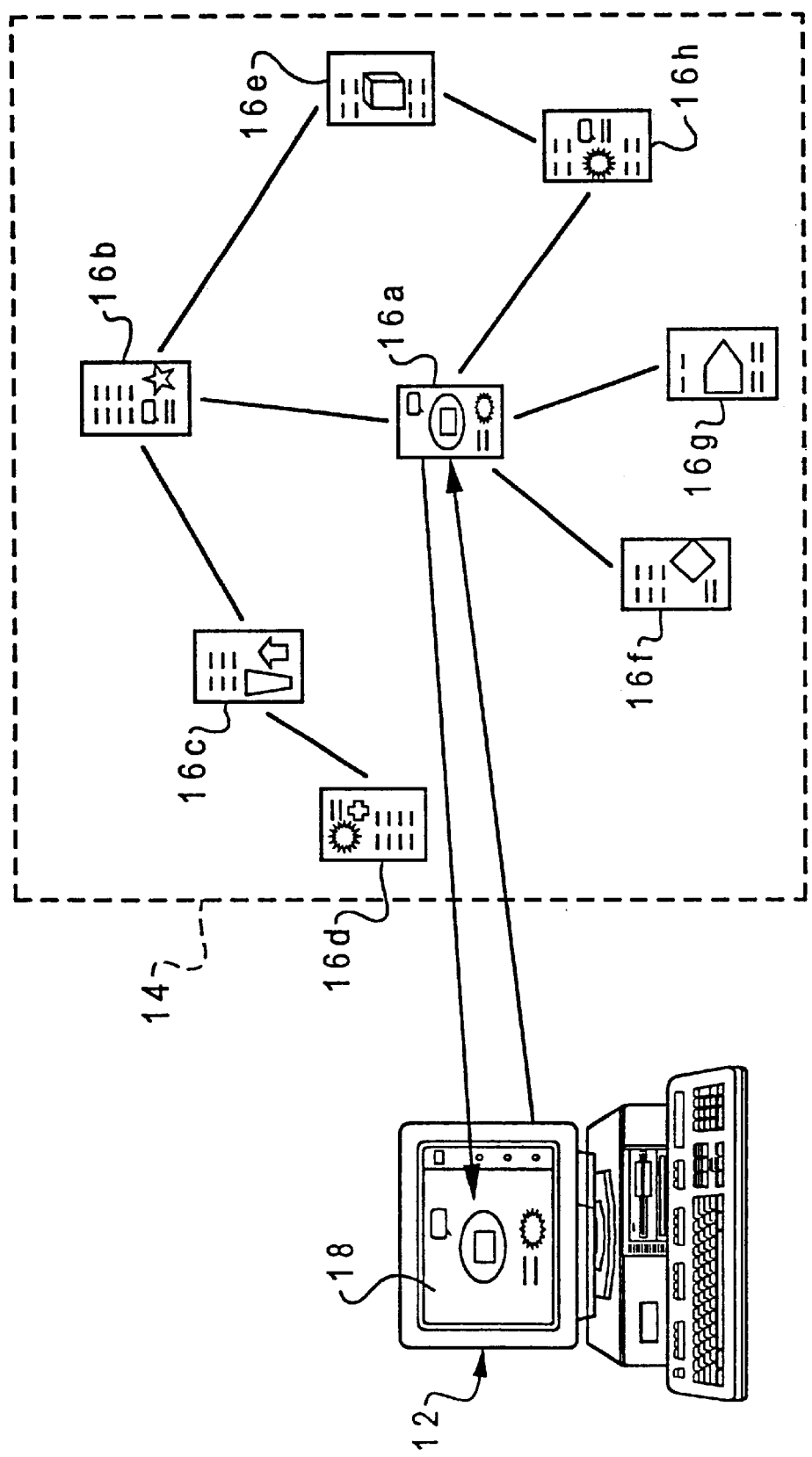
FIG. 2 is a pictorial representation of the retrieval of an object from a set of linked objects residing on the network, such as a page on the World Wide Web.
Figure 3:
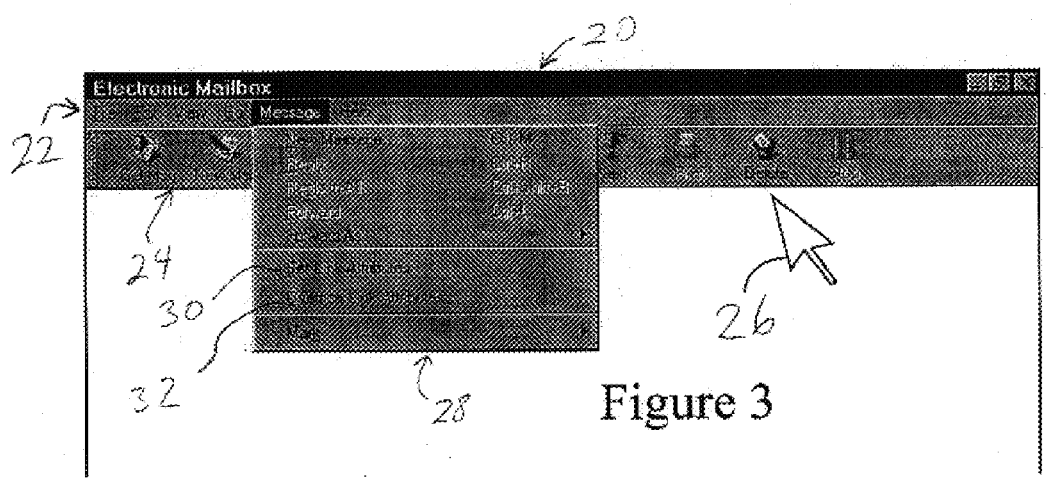
FIG. 3 is a depiction of a portion of an electronic mail application program (electronic mailbox), showing a pull-down menu having commands relating to environmental browser parameters that may be set for a particular link in an electronic message, in accordance with one implementation of the present invention.

With reference now to FIG. 3, there is depicted one embodiment 20 of an electronic mail (e-mail) application program designed in accordance with the present invention. E-mail program (or electronic mailbox) 20 is displayed on a video monitor of a computer system which has been programmed to carry out the invention as explained below. The details of the computer system may vary considerably, but are within the knowledge of one skilled in the art, and are omitted here. In an exemplary embodiment, the computer system is an Aptiva™ workstation marketed by International Business Machines Corp. (IBM), and uses an operating system such as Microsoft Windows 98, which allows one application program (such as electronic mailbox 20) to initiate or spawn a different application program (such as a web browser) and pass environmental parameters to the different application during program initiation.

Electronic mailbox 20 includes many common elements of a conventional graphical user interface. These elements include a menu bar 22, a toolbar 24, and a graphical pointer 26. In the depicted embodiment, graphical pointer 26 takes the form of an arrowhead, and is controlled by a graphical pointing device such as a mouse. Menu bar 22 has a plurality of commands including the "File," "Edit," "View," "Go," "Message" and "Help" commands. Selection of one of these commands using graphical pointer 26 results in the display of a pull-down menu, such as pull-down menu 28. Toolbar 24 has a plurality of buttons with text or icons that may be used execute certain of the commands that are also found on the pull-down menus.

Figure 4:
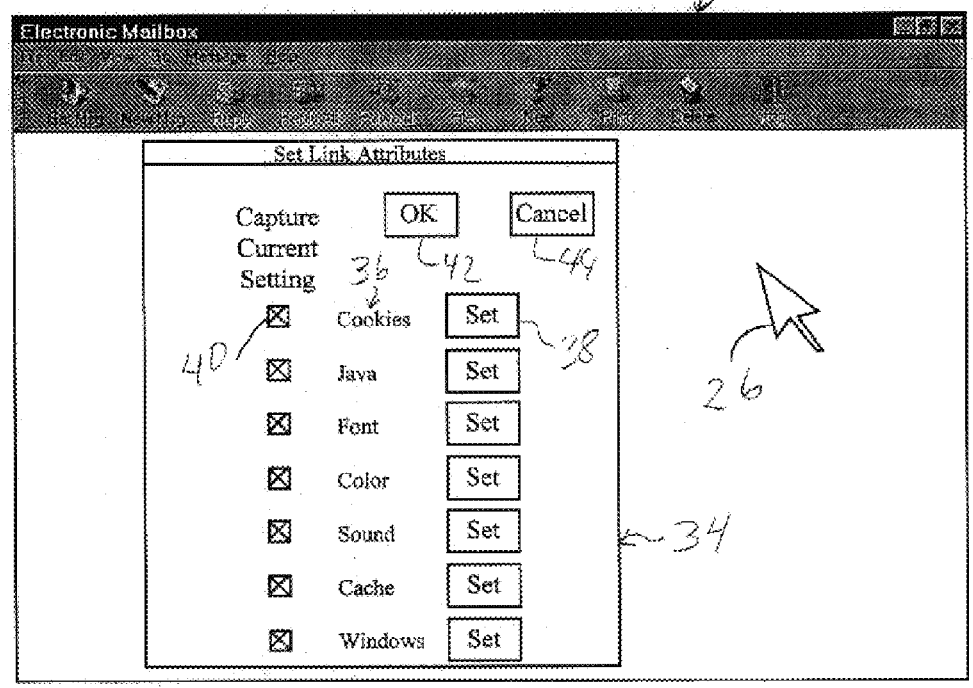
FIG. 4 is a depiction of the electronic mailbox of FIG. 3 showing a dialog box for setting environmental browser parameters to be associated with a particular link in an electronic message.

FIG. 3 illustrates how the user has selected the "Message" command of menu bar 22, causing the display of pull-down menu 28. Pull-down menu 28 has several commands, some of which may be conventional (such as the "New Message" command). In accordance with one implementation of the present invention, pull-down menu 28 has two new commands "Set Link Attributes" 30 and "Override Link Attributes" 32. The first of these commands is selected by a user who has prepared an e-mail message having one or more hypertext links therein, using the editor/composition function of electronic mailbox 20. Selection of the "Set Link Attributes" command 30 in pull-down menu 28 generates the display of a dialog box or window 34 as shown in FIG. 4.

Electronic mailbox 20 may be programmed to enable the "Set Link Attributes" command 30 only after an external link has been embedded in the e-mail message, and is selected or highlighted by the sender. In this manner, if there are multiple hypertext links embedded in the e-mail message, then different attributes may be assigned to the different links. Other means may be provided to bring up the Set Link Attributes dialog box 34. For example, the sender could depress a special button on the mouse (e.g., right-click) to activate a pop-up window (not shown) that would include command 30.

Dialog box 34 lists a plurality of environmental attributes 36 that may be used by a browser program in displaying the web page that is referenced by the link embedded in the e-mail message. In the illustrative embodiment, these parameters include cookies, java, font, color, sound, cache, and windows size. As discussed in the Background section, a cookie is used to identify a particular user or computer-workstation to a web site so that, among other things, the web page information can be customized. If the sender specifies a cookie, then a web browser launched from a link in the e-mail message will use that cookie; if no cookie is specified, then the browser looks for the cookie in a default location. The java attribute allows the sender to specify whether java or javascript are to be enabled when viewing the linked page. Font size and color may be selected to optimize viewing of the particular web page linked. Sound attributes to be specified may include volume, midi or wave file settings. Cache attributes of the browser, such as memory cache size and permanent storage cache size, may be specified for performance preferences. The size of the browser window(s) may also be specified.

Those skilled in the art will appreciate that this list is not exhaustive, and other browser attributes may be specified as well.

As indicated in FIG. 4, the sender may specify a custom setting for any of these parameters, by selecting one of the "Set" buttons 38 adjacent to the relevant parameter. A separate dialog box (not shown) is then displayed to allow the sender to input an exact value or setting. Alternatively, the sender can capture preferred attributes at discrete times when each web address is being inserted into the e-mail message, by checking one of the Capture Current Setting boxes 40 adjacent to the relevant attribute. The attribute may be captured by interrogating the sender's browser, or by examining a file associated with the browser which contains the various attribute settings. Once the proper settings have been made, the sender clicks on the "OK" button 42. A "Cancel" button 44 is provided as well, in case the sender decides against specifying any attributes.

The present invention thus encodes browser environmental attributes within the e-mail messages such that they are not seen by the user, but can be retrieved by a browser launched from the e-mail message. The attributes may be encoded using, e.g., HTML or XML (extensible markup language), and providing a new set of tags to identify each particular attribute. For example, the tag "<java=on>" within the link field could be used to specify that java is to be enabled for the link. These options are conveyed along with the e-mail message itself.

Figure 5:
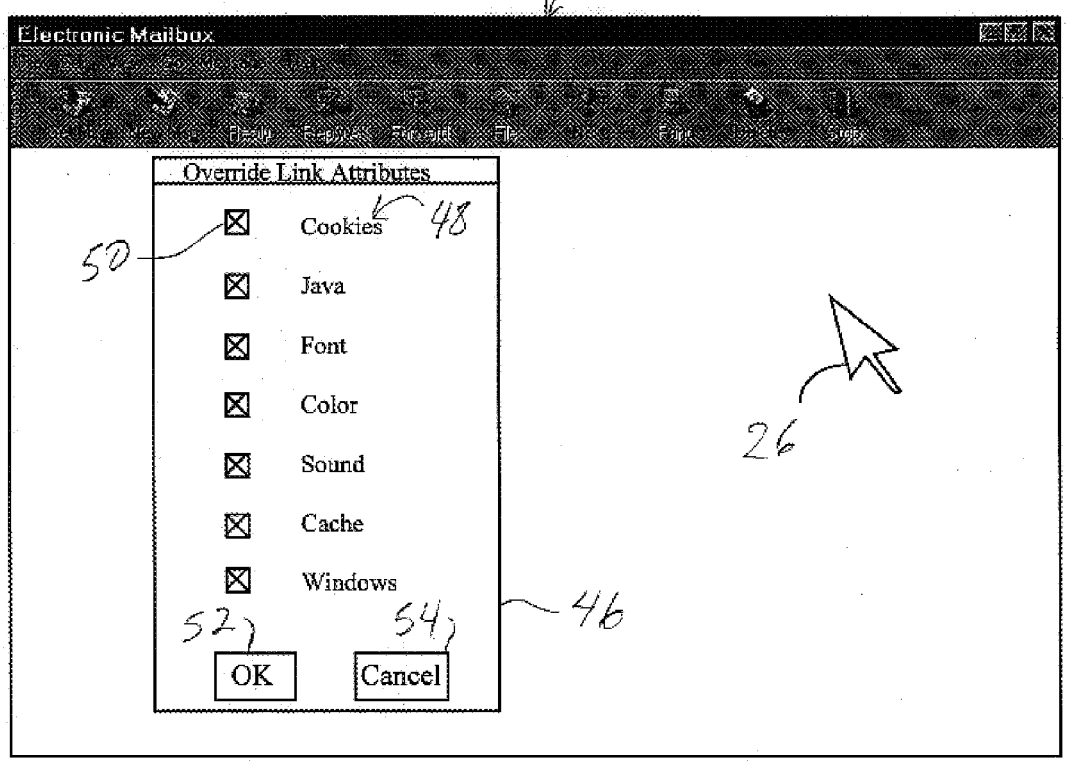
FIG. 5 is a depiction of the electronic mailbox of FIG. 3 showing a dialog box for overriding environmental browser parameters that have been associated with the particular link.

The receiver of the e-mail message may not, however, want to use the sender-provided browser settings for various reasons, such as personal preference, or security. In such a case, the present invention advantageously allows the message recipient to select which, if any, attributes to adopt from the sender of the e-mail message, prior to selecting an embedded link. This feature may be accessed, e.g., via the "Override Link Attributes" command 32 in pull-down menu 28. When a message recipient selects command 32 in reference to a link embedded in the e-mail message, another dialog box 42 is generated, as seen in FIG. 5. The message recipient can then selectively override any sender-provided attributes 48, by clicking on one of the override boxes 50 adjacent to the relevant attribute. After selecting the attributes to be overridden, the recipient clicks the "OK" button 52. A "Cancel" button 54 is again also provided. In this manner, when the recipient clicks on the link embedded within the e-mail message, the web browser will retrieve the page and display it using the recipient's default values for any attributes which have been overridden. While FIG. 5 illustrates the override functionality as being included in electronic mailbox 20, those skilled in the art will appreciate that this functionality could instead be enabled in the browser.

Figure 6:
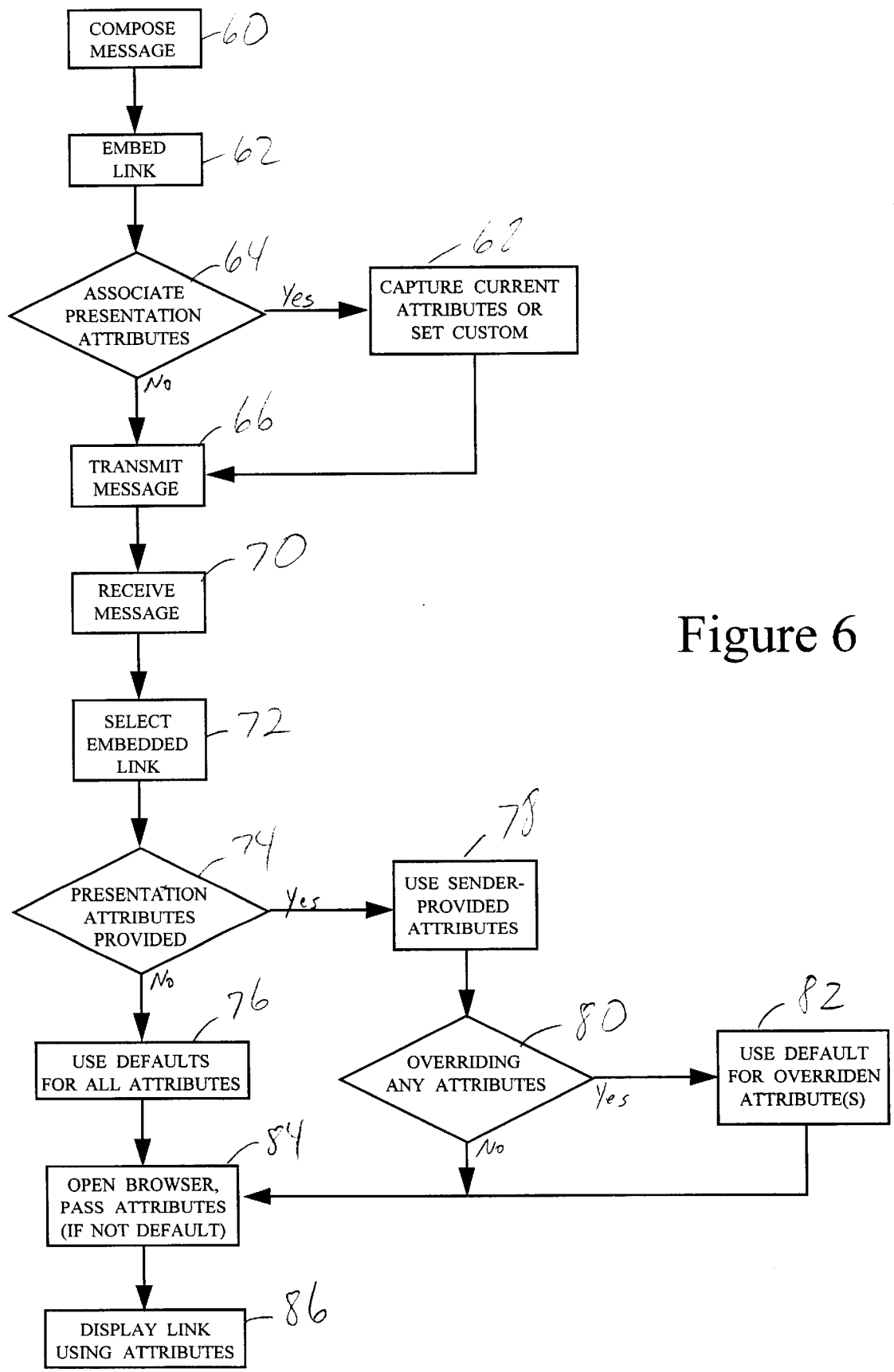
FIG. 6 is a chart illustrating the logic flow for creating and displaying a hypertext link embedded in an electronic mail message, according to one implementation of the present invention.

FIG. 6 is a flow chart illustrating the logical process in an exemplary implementation of the present invention. The communication process begins when a first user (the sender) begins to compose a message (60). The mailbox editor is used to create a new file and enter message information. As part of the composition, the sender inserts a hypertext link for a web page within the message (62). The user then decides whether to associate any specific presentation attributes with the link (64). If no attributes are to be provided, and the message is otherwise complete, the next step is to transmit it over the network (66). If, however, the sender desires to include custom attributes for a link, then those attributes are captured or set by the sender (68).

The message may be sent over the Internet, or via other media, such as a local area network (LAN). It is received by a second user (the recipient), who may open and view it with an appropriate electronic mailbox (70). When the recipient selects a link embedded in the message (72), the electronic mailbox determines if any link attributes have been associated with the link by the sender (74). If no attributes have been set, default values are to be used (76). If attributes have been set, those are assigned for use with the link (78). If the recipient desires any sender-defined attributes to be overridden (80), then the recipient's default values are used in lieu of those particular attributes (82). The viewing software (e.g., web browser) is then opened, and the appropriate attributes are passed to the viewing software (84). If default values are to be used for all attributes, it is not necessary to pass any values to the browser. The link (web page) is then presented using the appropriate environmental attributes (86).

The present invention is not limited to the context of adjusting browser settings associated with a hypertext link embedded in an e-mail message, but more generally applies to environmental parameters which can be associated with a graphical user interface that is provided to present a particular document referenced in any another document. For example, the basic file transfer protocol (FTP) might be used to retrieve a document that has an embedded hypertext link, as opposed to retrieval of a document via e-mail. Alternatively, the link might not be a hypertext link, e.g., it could be an FTP link provided within a web page. In these cases as well, presentation attributes may be associated with the link and applied in presenting the linked information, regardless of protocol or the nature of the documents.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the invention can be applied to networks other than the Internet, including peer-to-peer networks. It is therefore contemplated that such modifications can be made without departing from the spirit or scope of the present invention as defined in the appended claims.

What is claimed is:

1. A method of electronically conveying information, comprising the steps of:

composing a first electronic document having at least one selectable link and at least one presentation attribute associated with said at least one selectable link embedded therein, said presentation attribute controlling the manner in which one or more documents are presented to a user, said selectable link providing an address uniquely identifying a second electronic document, said composing step being performed at a first node of a network;

transmitting said first electronic document to a second node of said network;

selecting the link using a graphical user interface of said second node;

responsive to selecting the link, accessing said second electronic document at the address provided by the link; and presenting the second electronic document at said second node using said at least one presentation attribute associated with the link.

2. The method of claim 1 wherein the graphical user interface includes a graphical pointer controlled by a graphical pointing device of a computer system at said second node, and said selecting step includes the steps of:

displaying the link on a monitor of the computer system using viewing software; and actuating the graphical pointing device while the graphical pointer is held over the link on the monitor.

3. The method of claim 1 wherein:

the first electronic document is an electronic mail message;

said composing step is performed using an electronic mailbox program;

the second electronic document is a hypertext page; and said presenting step is performed using a web browser.

4. The method of claim 1 wherein said composing step includes the step of associating the presentation attribute with the link by capturing a current setting of the presentation attribute.

5. The method of claim 1 wherein said composing step includes the step of associating the presentation attribute with the link by specifying a custom setting for the presentation attribute.

6. The method of claim 1, wherein said second document is presented at said second node using a web browser, and said presentation attribute comprises an environmental attribute of said web browser.

7. A method of composing an electronic document, comprising the steps of:

creating a file using an editor application on a computer system;

inserting at least one selectable link in the file, wherein the link provides an address uniquely identifying an external electronic document; and associating at least one presentation attribute with the link and encoding said presentation attribute in said file, said presentation attribute controlling the manner in which said external electronic document is presented to a user.

8. The method of claim 7 wherein said associating step captures a current setting of the presentation attribute.

9. The method of claim 7 wherein said associating step specifies a custom setting for the presentation attribute.

10. The method of claim 7 further comprising the step of transmitting the file with the encoded presentation attribute across a network connected to the computer system.

11. The method of claim 7 wherein:

said creating step creates the file as an electronic mail message;

said inserting step inserts the link as a hypertext link; and said associating step associates the presentation attribute as an environmental attribute of a web browser.

12. A method of communicating electronic information, comprising the steps of:

opening a first electronic document using a computer system, wherein the first electronic document has at least one selectable link and at least one presentation attribute associated with said at least one selectable link embedded therein, said presentation attribute controlling the manner in which one or more documents are presented to a user, said selectable link providing an address uniquely identifying a second electronic document;

selecting the link using a graphical user interface of the computer system;

responsive to selecting the link, accessing said second document at the address provided by the link; and presenting the second electronic document at the computer system using said at least one presentation attribute associated with the link.

13. The method of claim 12 further comprising the step of receiving the first electronic document from a network connected to the computer system.

14. The method of claim 12 wherein the graphical user interface includes a graphical pointer controlled by a graphical pointing device of the computer system, and said selecting step includes the steps of:

displaying the link on a monitor of the computer system using viewing software; and actuating the graphical pointing device while the graphical pointer is held over the link on the monitor.

15. The method of claim 12 wherein:

the first electronic document is an electronic mail message;

said opening step is performed using an electronic mailbox program;

the second electronic document is a hypertext page; and said presenting step is performed using a web browser.

16. The method of claim 12, wherein said second document is presented at said computer system using a web browser, and said presentation attribute comprises an environmental attribute of said web browser.

17. A method of communicating electronic information, comprising the steps of:

opening a first electronic document using a computer system, wherein the first electronic document has at least one selectable link embedded therein, the link providing an address of a second electronic document;

selecting the link using a graphical user interface of the computer system; and presenting the second electronic document at the computer system using at least one presentation attribute associated with the link;

wherein at least one other presentation attribute is associated with the link, and further comprising the step of overriding the other presentation attribute such that said presenting step presents the second electronic document using a default presentation attribute in lieu of the other presentation attribute.

18. A communications system comprising:

a first computer node;

a second computer node;

means, located at said first computer node, for composing a first electronic document having at least one selectable link embedded therein, the link providing an address of a second electronic document, and having at least one presentation attribute associated therewith;

network means for transmitting said first electronic document from said first computer node to said second computer node; and means, located at said second computer node, for enabling the presentation of the second electronic document at said second computer node using the presentation attribute associated with the link, in response to selection of the link;

wherein at least one other presentation attribute is associated with the link; and wherein said enabling means allows the overriding of the other presentation attribute such that the second electronic document is presented using a default presentation attribute in lieu of the other presentation attribute.

19. The communications system of claim 18 wherein said network means includes the Internet.

20. The communications system of claim 18 wherein said composing means associates the presentation attribute with the link by capturing a current setting of the presentation attribute.

21. The communications system of claim 18 wherein said composing means associates the presentation attribute with the link by specifying a custom setting for the presentation attribute.

22. A computer program product comprising:

a storage medium; and program instructions stored on said storage medium for:

(a) creating a file on a computer system, (b) inserting at least one selectable hypertext link in the file wherein the hypertext link provides an address of an external electronic document, said external electronic document viewable by a web browser, and (c) inserting at least one browser environmental attribute in the file, said at least one browser environmental attribute being associated with the link, said browser environmental attribute controlling the presentation of said external electronic document by said web browser.

23. The computer program product of claim 22 wherein said program instructions associate the presentation attribute with the link by capturing a current setting of the presentation attribute.

24. The computer program product of claim 22 wherein said program instructions associate the presentation attribute with the link by specifying a custom setting for the presentation attribute.

25. The computer program product of claim 22 wherein said program instructions create the file as an electronic mail message.

26. A computer program product comprising:

a storage medium; and program instructions stored on said storage medium for:

(a) opening a first electronic document using a computer system, wherein the first electronic document has at least one selectable hypertext link embedded therein providing an address of a second electronic document, and at least one environmental attribute associated with said selectable hypertext link, (b) receiving an interactive user selection selecting the hypertext link, (c) responsive to receiving an interactive user selection selecting the hypertext link, retrieving said second electronic document, and (d) enabling the presentation of the second electronic document at the computer system with a web browser interface using said at least one browser environmental attribute associated with the hypertext link.

27. The computer program product of claim 26 wherein the first electronic document is an electronic mail message.

28. A computer program product comprising:

a storage medium; and program instructions stored on said storage medium for opening a first electronic document using a computer system wherein the first electronic document has at least one selectable link embedded therein providing an address of a second electronic document, selecting the link, and enabling the presentation of the second electronic document at the computer system using at least one presentation attribute associated with the link;

wherein at least one other presentation attribute is associated with the link, and said program instructions further enable the overriding of the other presentation attribute such that the second electronic document is presented using a default presentation attribute in lieu of the other presentation attribute.

* * * * *